Dec. 12, 1967   R. H. SPAULDING ETAL   3,357,589
SUSPENSION SYSTEM FOR MULTI-WALLED STORAGE TANK
Filed Dec. 27, 1965

INVENTORS
ROY H. SPAULDING
FRED P. SNYDER
BY Ralph W. Kalish
ATTORNEY

United States Patent Office 3,357,589
Patented Dec. 12, 1967

3,357,589
SUSPENSION SYSTEM FOR MULTI-WALLED STORAGE TANK
Roy H. Spaulding and Fred P. Snyder, St. Louis County, Mo., assignors to Essex Cryogenics Inc., St. Louis, Mo., a corporation of Missouri
Filed Dec. 27, 1965, Ser. No. 516,335
8 Claims. (Cl. 220—15)

This invention relates in general to multi-walled storage tanks and, more particularly, to a suspension system for the inner vessels of such tanks.

It is an object of the present invention to provide a suspension system for multi-walled storage tanks, especially of the type having outer and inner vessels with the latter adapted for receiving liquefied, normally gaseous, material or so-called cryogenic liquids, for example, liquid oxygen. Tanks of this character have had wide usage in liquid oxygen converter systems, such as those used as a source of breathing oxygen in air or space craft designed for high altitude flight. In such systems, oxygen is permitted to volatilize from the liquid phase to the gaseous state for presentation to the operating personnel.

It is another object of the present invention to provide a suspension system for use in tanks of the type stated which are designed to reliably retain the inner and outer vessels in spaced relationship so that the intervening volume may be evacuated for conducing to thermal insulation of the inner vessel for maintenance of the cryogenic liquid at temperatures below its volatilization point, which in the case of liquid oxygen is —297° F.

Another object of the present invention is to provide a suspension system of the type and for the purpose stated which is uniquely adapted to absorb vibration, shock, and like physical factors encountered in high altitude flying so as to protect the cryogenic liquid against the impact of such forces.

It is a further object of the present invention to provide a suspension system for the use and purpose stated which minimizes to an extent hitherto unattained heat transfer between the outer and inner vessels or shells so as to retain the cryogenic liquid at or below its critical storage temperature.

It is a still further object of the present invention to provide a suspension system which incorporates a plurality of spring mounts which are so constructed as to resist both lateral and direct movement between the tank vessels so as to conduce to properly, substantially centered positionment of the inner vessel within the outer vessel so that the extent of the intervening volume remains relatively constant.

It is a still further object of the present invention to provide a suspension system of the type stated wherein the components of such system may be most economically manufactured; which are fully reliable and durable in usage; which are so constructed as to provide ease of assembly of the tanks; and which through their novel construction assure of requisite insulation of the stored liquid.

Other objects and details of the present invention will be apparent from the following description when read in connection with the accompanying drawing (one (1) sheet), wherein FIGURE 1 is a vertical sectional view taken through the outer vessel of a multi-walled storage tank incorporating a suspension system constructed in accordance with and embodying the present invention.

Figure 1:
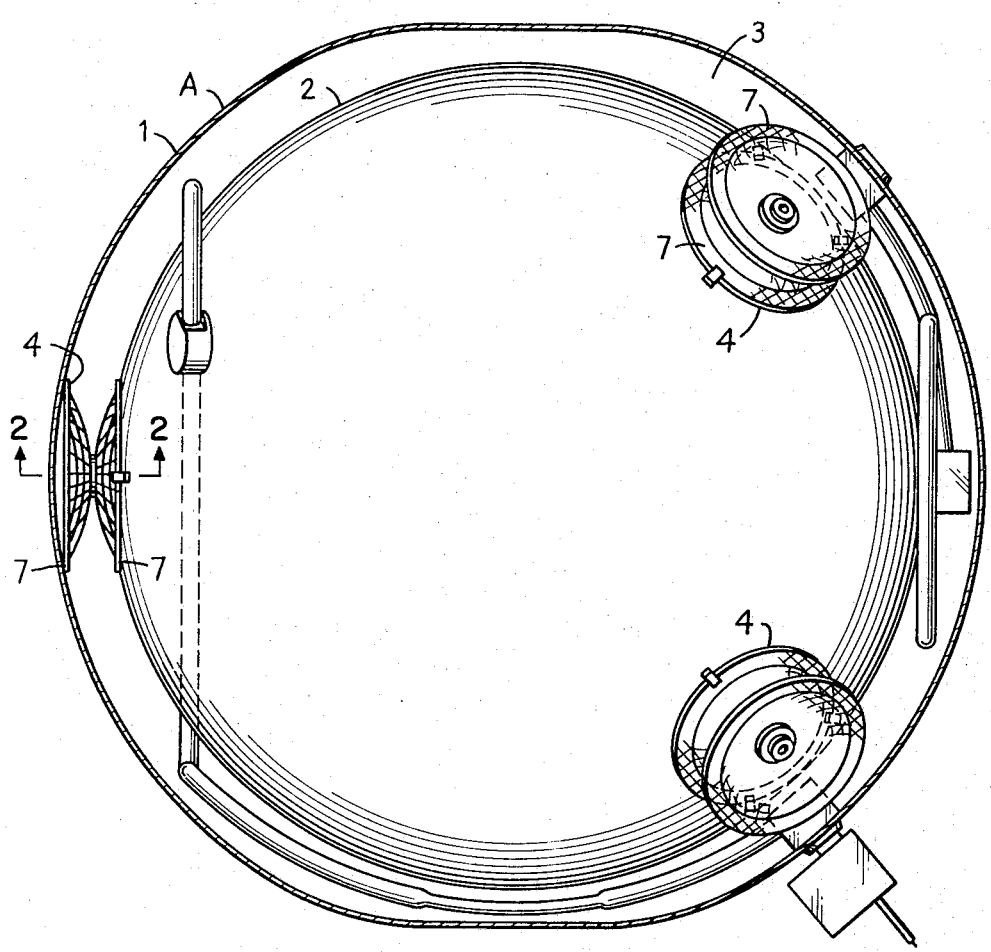

Referring now by reference characters to the drawings which illustrate the preferred embodiment of the present invention, A generally designates a container for a cryogenic liquid, being of the multi-walled type. Said container A comprises an outer vessel or shell 1 and an inner vessel or shell 2 of relatively reduced diameter with respect to the former; said inner shell 2 being adapted for stored reception of a liquefied, normally gaseous, material or so-called cryogenic liquid which must be maintained at a temperature below its volatilization point in order that the same will be available for conversion to the gaseous phase when desired, as for instance, in the case of conversion of liquid oxygen to gas form for operational personnel usage. Each of the said inner and outer shells 1, 2 is substantially spherical in accordance with conventional design, there being, due to the radial difference upon which said vessels are formed, a spacing or volume therebetween as indicated at 3 which should preferably be substantially constant throughout its extent so that maximum thermal insulation of said inner vessel 2 is assured.

In order to maintain said inner vessel 2 in requisite spaced relationship from vessel 1, there is provided a suspension system which comprises a multiplicity of spring mounts indicated broadly 4.

Figures 2, 3:
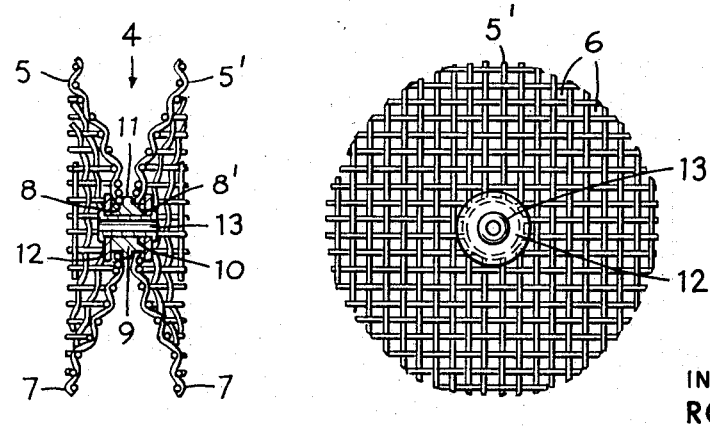
FIGURE 2 is a horizontal transverse sectional view taken on the line 2—2 of FIGURE 1.
FIGURE 3 is an end view of the spring mount illustrated in FIGURE 2.

As may best be seen in FIGURES 2 and 3, each spring mount incorporates a pair of generally concave or dome-shaped components 5, 5' which are in back to back relationship and hence open away from each other. Each component 5, 5' is formed of resilient, durable material resistant to deterioration under high temperatures, being of lightweight, preferably perforated or foraminous, for conducing to minimal heat transfer. In the preferred construction, components 5, 5' may be readily constructed of spring wire stock interwoven in screen-like manner to present a mesh with relatively large openings 6. The length of the chord of the arc on which each component 5, 5' is formed may be less than the diameter of the related circle, since space requirements will control. However, the maximum depth of each component 5, 5' must be sufficiently great as to allow for requisite yieldability in a direction normal to the chord. Each component 5, 5' is circumferentially flattened to form a peripheral flange 7 for surfacewise abutment against the confronting face of the inner and outer vessels 1, 2. Centrally, or at their apices, components 5, 5' are provided with aligned apertures 8, 8' respectively, for extension therethrough of a cylindrical spacer 9, as formed of plastic or the like, and having an axial bore 10. Spacer 9 intermediate its length embodies a circumferentially extending, radially outwardly projecting flange 11 for interposition between the proximate confronting faces of components 5, 5' for limiting contact therebetween should one such component be tilted with respect to the other, as well as to serve for insulation between components 5, 5'. Disposed against the opposite end faces of spacer 9 are relatively diametrally enlarged collars 12 which are retained in position by a rivet 13 extending through bore 10 and having its ends properly flattened for retaining spacer 9 and collars 12 in intimate unified construction and for assuring maintenance of components 5, 5' in appropriate mutual attitude.

Spacers 9 are formed of such material so as to have minimal heat conductive properties so that by the use of said spacers the thermal insulation of inner vessel 1 is enhanced, since said spacers provide a most effective barrier to heat transfer between said component. Furthermore, the unique configuration of components 5, 5' must be observed for by reason of having a parti-spherical contour the same present maximum resistance to flexing or momentary deformation under stress so as to retain inner shell 1 in appropriate spatial relationship to outer vessel 2. Furthermore, the said contour of components 5, 5' present desired rigidity for structures which are of mesh character so that the same provide physical integrity together with high resistance to heat transfer.

In actual usage, spring mounts 4 may be suitably disposed between inner and outer vessels 1, 2 in any preferred arrangement, such as having one such mount provided between the extreme upper portions of said vessels and three others located on a circle below the equator of said inner vessel 1 and about a circle parallel thereto. The individual spring mounts 4 may be preferably slightly preloaded when container A is empty. Said vessels 1, 2 may be assembled in any conventional manner, there being many such techniques well known in the art.

It should be understood that changes and modifications in formation, construction, and arrangement and combination of the several parts of the suspension system for multi-walled storage tank may be made and substituted for these herein shown and described without departing from the nature and principle of our invention.

Having described our invention, what we desire to obtain by Letters Patent is:

1. In a multi-walled container having an outer vessel, an inner vessel disposed within said outer vessel and being of less diameter than said outer vessel for creating an intervening insulating space between said vessels, suspension means disposed within said insulating space for maintaining said inner vessel in spaced relationship to said outer vessel, said suspension means comprising a plurality of spaced-apart spring mounts, each spring mount comprising a pair of hollow parti-spherical members with their convex faces toward each other and their concave faces opening away from each other and means between said convex faces interengaging said members for integrating same into a unit.

2. In a multi-walled container, a spring mount as defined in claim 1 and further characterized by each of said members being of foraminous character.

3. In a multi-walled container, a spring mount as defined in claim 1 and further characterized by each member being provided with a peripheral flange for abutment against the confronting surfaces and inner and outer vessels.

4. In a multi-walled container, a spring mount as defined in claim 1 wherein each member is constructed of wire stock, interwoven for providing a relatively large mesh.

5. In a multi-walled container, spring mounts as defined in claim 1 wherein each member is provided with a peripheral flange falling within the plane including the chord upon which the member is formed, said flanges being presented for abutment against the confronting faces of said inner and outer vessels, said members being formed of wire stock interwoven to provide a mesh, and said interengaging means being formed of material having minimal heat conductive properties.

6. In a multi-walled container, a spring mount as defined in claim 5 and further characterized by each of said members being provided with aligned openings in the apex of their concavity, said interengaging means projecting through said aligned openings, and means retaining said interengaging member in such position.

7. In a multi-walled container, a spring mount as defined in claim 6 and further characterized by said interengaging means comprising a cylindrically shaped spacer, said spacer being provided with a radially outwardly projecting flange for disposition between the confronting back portions of said members, and means for preventing axial displacement of said spacer.

8. In a multi-walled container, a spring mount as defined in claim 7 and further characterized by said members being fabricated of metal wire stock and said spacer being constructed of molded plastic.

References Cited

UNITED STATES PATENTS

| 1,023,531 | 4/1912 | Shafer | 220—15 |
| 1,055,950 | 3/1913 | Steel | 220—15 |
| 1,249,785 | 12/1917 | Layman et al. | 220—15 |
| 3,043,466 | 7/1962 | Gardner | 220—15 |

FOREIGN PATENTS 683,855  12/1952  Great Britain.

THERON E. CONDON, *Primary Examiner.*

J. R. GARRETT, *Examiner.*